(12) United States Patent
Schane et al.

(10) Patent No.: US 12,215,058 B2
(45) Date of Patent: *Feb. 4, 2025

(54) DRY MIX AND CONCRETE COMPOSITION CONTAINING BED ASH AND RELATED METHODS

(71) Applicant: Crown Products & Services, Inc., Gillette, WY (US)

(72) Inventors: Douglas W. Schane, Adena, OH (US); Arthur B. Brown, Durango, CO (US)

(73) Assignee: Crown Products & Services, Inc., Gillette, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,848

(22) Filed: Nov. 14, 2023

(65) Prior Publication Data
US 2024/0083818 A1    Mar. 14, 2024

Related U.S. Application Data

(60) Continuation of application No. 17/950,637, filed on Sep. 22, 2022, now Pat. No. 11,840,482, which is a continuation of application No. 17/201,779, filed on Mar. 15, 2021, now Pat. No. 11,479,506, which is a division of application No. 16/137,163, filed on Sep. 20, 2018, now Pat. No. 10,981,831.

(60) Provisional application No. 62/641,838, filed on Mar. 12, 2018, provisional application No. 62/561,556, filed on Sep. 21, 2017.

(51) Int. Cl.
| | |
|---|---|
| C04B 28/02 | (2006.01) |
| C04B 14/28 | (2006.01) |
| C04B 28/04 | (2006.01) |
| C04B 28/06 | (2006.01) |
| C04B 40/00 | (2006.01) |
| C04B 111/00 | (2006.01) |
| C09K 17/10 | (2006.01) |
| E01C 7/14 | (2006.01) |
| E02D 3/12 | (2006.01) |

(52) U.S. Cl.
CPC ............ *C04B 28/021* (2013.01); *C04B 14/28* (2013.01); *C04B 28/04* (2013.01); *C04B 28/065* (2013.01); *C04B 40/0042* (2013.01); *E01C 7/142* (2013.01); *E01C 7/147* (2013.01); *E02D 3/123* (2013.01); *C04B 2111/00043* (2013.01); *C04B 2111/00724* (2013.01); *C04B 2111/00732* (2013.01); *C04B 2111/00741* (2013.01); *C04B 2111/0075* (2013.01); *C09K 17/10* (2013.01)

(58) Field of Classification Search
CPC ....... C04B 28/021; C04B 14/28; C04B 28/04; C04B 28/065; C04B 40/0042; C04B 2111/00043; C04B 2111/00724; C04B 2111/00732; C04B 2111/00741; C04B 2111/0075; C09K 17/10; E01C 7/142; E01C 7/147; E02D 3/123

See application file for complete search history.

(56) References Cited

U.S. PATENT DOCUMENTS

| | | | |
|---|---|---|---|
| 4,250,134 A | * | 2/1981 | Minnick ................. C04B 28/02 588/256 |
| 5,545,297 A | | 8/1996 | Andersen et al. |
| 5,549,859 A | | 8/1996 | Andersen et al. |
| 5,580,378 A | | 12/1996 | Shulman |
| 5,622,556 A | | 4/1997 | Shulman |
| 5,658,624 A | | 8/1997 | Anderson et al. |
| 5,725,652 A | | 3/1998 | Shulman |
| 5,772,752 A | | 6/1998 | Liskowitz et al. |
| 5,797,496 A | | 8/1998 | Kirchen et al. |
| 5,798,151 A | | 8/1998 | Andersen et al. |
| 5,849,075 A | | 12/1998 | Hopkins et al. |
| 5,851,282 A | | 12/1998 | Odler |
| 6,277,189 B1 | | 8/2001 | Chugh |
| 6,293,731 B1 | | 9/2001 | Studer |
| 6,334,895 B1 | | 1/2002 | Bland |
| 6,468,345 B1 | | 10/2002 | Zhu et al. |
| 6,517,631 B2 | | 2/2003 | Bland |
| 6,521,037 B1 | | 2/2003 | Hurt et al. |
| 6,528,547 B2 | | 3/2003 | Shulman |
| 6,554,888 B1 | | 4/2003 | Chugh |
| 6,638,355 B2 | | 10/2003 | Shulman |
| 6,669,773 B2 | | 12/2003 | Malloy et al. |
| 6,802,898 B1 | | 10/2004 | Liskowitz et al. |
| 6,808,562 B2 | | 10/2004 | Bland |
| 6,890,507 B2 | | 5/2005 | Chen et al. |
| 7,077,203 B1 | | 7/2006 | Roddy et al. |
| 7,174,962 B1 | | 2/2007 | Roddy et al. |
| 7,204,307 B2 | | 4/2007 | Roddy et al. |

(Continued)

FOREIGN PATENT DOCUMENTS

| | | |
|---|---|---|
| JP | 10081554 | 3/1998 |
| JP | 2007238380 | 9/2007 |

(Continued)

*Primary Examiner* — Anthony J Green

(74) *Attorney, Agent, or Firm* — Reinhart Boerner Van Deuren s.c.

(57) ABSTRACT

Embodiments of a dry mix for producing a concrete composition are provided. The dry mix includes aggregate, cement, and bed ash. The bed ash contains the combustion product of a fluidized bed coal combustion reaction. Additionally, embodiments of a method of preparing the dry mix and embodiments of a method of preparing a concrete composition are provided. The dry mix is also suitable for repairing soil slips, and embodiments of a method of repairing a soil slip are also provided.

19 Claims, 3 Drawing Sheets

(56) References Cited

U.S. PATENT DOCUMENTS

| | | |
|---|---|---|
| 7,213,646 B2 | 5/2007 | Roddy et al. |
| 7,335,252 B2 | 2/2008 | Roddy et al. |
| 7,344,592 B2 | 3/2008 | Setliff et al. |
| 7,485,184 B2 | 2/2009 | Hill et al. |
| 7,507,083 B2 | 3/2009 | Comrie |
| 7,582,158 B2 | 9/2009 | Setliff et al. |
| 7,658,796 B2 | 2/2010 | Nordmeyer et al. |
| 7,674,442 B2 | 3/2010 | Comrie |
| 7,704,907 B2 | 4/2010 | Guenther et al. |
| 7,758,827 B2 | 7/2010 | Comrie |
| 7,776,301 B2 | 8/2010 | Comrie |
| 7,812,209 B2 | 10/2010 | Jacquemmoz et al. |
| 7,823,858 B2 | 11/2010 | Matsufuji et al. |
| 7,837,787 B2 | 11/2010 | De La Roij |
| 7,850,776 B2 | 12/2010 | Gartner et al. |
| 7,892,349 B2 | 2/2011 | Hill et al. |
| 7,892,350 B2 | 2/2011 | Hill et al. |
| 7,897,831 B2 | 3/2011 | Birdwell |
| 7,901,505 B2 | 3/2011 | Hill et al. |
| 7,955,577 B2 | 6/2011 | Comrie |
| 7,981,375 B2 | 7/2011 | Ramberg et al. |
| 7,985,324 B2 | 7/2011 | Whellock |
| 7,988,939 B2 | 8/2011 | Comrie |
| 7,993,449 B2 | 8/2011 | de la Roij |
| 8,007,581 B2 | 8/2011 | Scott et al. |
| 8,092,753 B2 | 1/2012 | Dynan et al. |
| 8,097,220 B2 | 1/2012 | Dynan et al. |
| 8,114,368 B2 | 2/2012 | Comrie |
| 8,118,927 B2 | 2/2012 | Price |
| 8,193,115 B2 | 6/2012 | Birdwell |
| 8,215,079 B2 | 7/2012 | Sinclair |
| 8,216,955 B2 | 7/2012 | Guenther et al. |
| 8,221,694 B2 | 7/2012 | Dynan et al. |
| 8,226,913 B2 | 7/2012 | Comrie |
| 8,236,098 B2 | 8/2012 | Muehlfeld et al. |
| 8,257,486 B2 | 9/2012 | Nayak et al. |
| 8,313,323 B2 | 11/2012 | Comrie |
| 8,361,406 B2 | 1/2013 | Dynan et al. |
| 8,361,420 B2 | 1/2013 | Dynan et al. |
| 8,501,128 B2 | 8/2013 | Comrie |
| 8,545,778 B2 | 10/2013 | Comrie |
| 8,551,216 B2 | 10/2013 | Dynan et al. |
| 8,617,308 B1 | 12/2013 | Douglas et al. |
| 8,617,438 B1 | 12/2013 | Douglas et al. |
| 8,623,287 B2 | 1/2014 | Dynan et al. |
| 8,627,888 B2 | 1/2014 | Santra et al. |
| 8,641,819 B2 | 2/2014 | Sawabe et al. |
| 8,658,115 B2 | 2/2014 | Comrie |
| 8,703,081 B2 | 4/2014 | Comrie |
| 8,709,150 B2 | 4/2014 | Behera et al. |
| 8,741,054 B2 | 6/2014 | Fried |
| 8,747,549 B1 | 6/2014 | Douglas et al. |
| 8,795,428 B1 | 8/2014 | Hill et al. |
| 8,821,803 B2 | 9/2014 | Ramberg et al. |
| 8,881,909 B2 | 11/2014 | Quadrio Curzio |
| 8,901,023 B2 | 12/2014 | Guenther et al. |
| 8,920,158 B2 | 12/2014 | Comrie |
| 8,945,300 B2 | 2/2015 | Al-Mehthel et al. |
| 8,961,684 B2 | 2/2015 | Fried |
| 8,974,593 B2 | 3/2015 | Guynn et al. |
| 9,023,149 B1 | 5/2015 | Douglas et al. |
| 9,090,508 B2 | 7/2015 | Gong et al. |
| 9,102,567 B1 | 8/2015 | Hansen et al. |
| 9,102,870 B1 | 8/2015 | Naguib |
| 9,115,026 B2 | 8/2015 | Tanaka et al. |
| 9,169,453 B2 | 10/2015 | Comrie |
| 9,238,591 B2 | 1/2016 | Guynn et al. |
| 9,272,953 B2 | 3/2016 | Guynn et al. |
| 9,284,219 B2 | 3/2016 | Wilson et al. |
| 9,284,224 B2 | 3/2016 | Gosavi et al. |
| 9,302,448 B2 | 4/2016 | Dubey et al. |
| 9,365,451 B2 | 6/2016 | Fried |
| 9,410,386 B2 | 8/2016 | Cornelius et al. |
| 9,416,967 B2 | 8/2016 | Comrie |
| 9,468,887 B2 | 10/2016 | Ramberg et al. |
| 9,566,587 B2 | 2/2017 | Warkentin et al. |
| 9,663,362 B2 | 5/2017 | Van Mechelen et al. |
| 9,670,096 B1 | 6/2017 | Zubrod |
| 9,702,554 B2 | 7/2017 | Comrie |
| 9,708,217 B2 | 7/2017 | Song et al. |
| 9,725,365 B1 | 8/2017 | Zubrod |
| 10,981,831 B2 | 4/2021 | Schane et al. |
| 11,479,506 B2 | 10/2022 | Schane et al. |
| 11,840,482 B2 * | 12/2023 | Schane .............. E01C 7/147 |
| 2001/0039902 A1 | 11/2001 | Hedley |
| 2003/0116887 A1 | 6/2003 | Scott |
| 2004/0040245 A1 | 3/2004 | Schwartz |
| 2004/0144287 A1 | 7/2004 | Tardif et al. |
| 2004/0217500 A1 | 11/2004 | Sinclair |
| 2005/0066860 A1 | 3/2005 | Logan et al. |
| 2006/0032408 A1 | 2/2006 | Strabala |
| 2006/0037271 A1 | 2/2006 | Sinclair, Sr. |
| 2006/0287197 A1 | 12/2006 | Maslanka et al. |
| 2007/0011973 A1 | 1/2007 | Sinclair et al. |
| 2007/0184394 A1 | 8/2007 | Comrie |
| 2007/0219402 A1 | 9/2007 | Godfrey et al. |
| 2007/0266903 A1 | 11/2007 | Gartner et al. |
| 2007/0277472 A1 | 12/2007 | Sinclair |
| 2008/0050578 A1 | 2/2008 | Sinclair, Sr. |
| 2008/0134943 A1 | 6/2008 | Godfrey et al. |
| 2009/0010099 A1 | 1/2009 | Maslanka et al. |
| 2009/0142143 A1 | 6/2009 | Peters |
| 2009/0151292 A1 | 6/2009 | Sinclair, Sr. |
| 2009/0200156 A1 | 8/2009 | Whellock |
| 2009/0258777 A1 | 10/2009 | Tardif et al. |
| 2009/0314185 A1 | 12/2009 | Whellock |
| 2010/0006010 A1 | 1/2010 | Hinczak |
| 2010/0189507 A1 | 7/2010 | Hird |
| 2010/0282595 A1 | 11/2010 | Whellock |
| 2011/0020199 A1 | 1/2011 | Hemmings et al. |
| 2011/0174194 A1 | 7/2011 | Hird |
| 2012/0118831 A1 | 5/2012 | Hemmings et al. |
| 2012/0145046 A1 | 6/2012 | Hansen et al. |
| 2013/0125791 A1 | 5/2013 | Fried et al. |
| 2013/0125799 A1 | 5/2013 | Fried et al. |
| 2013/0263758 A1 | 10/2013 | Skoda et al. |
| 2014/0353551 A1 | 12/2014 | Dengler et al. |
| 2014/0374097 A1 | 12/2014 | Morgan et al. |
| 2014/0374948 A1 | 12/2014 | Vincent et al. |
| 2015/0107491 A1 | 4/2015 | Ball et al. |
| 2016/0177209 A1 | 6/2016 | Fried |
| 2016/0327265 A1 | 11/2016 | Comrie |
| 2016/0340840 A1 | 11/2016 | Yun |
| 2017/0106378 A1 | 4/2017 | Warkentin et al. |
| 2017/0167421 A1 | 6/2017 | Ramberg et al. |
| 2017/0241871 A1 | 8/2017 | Mayelle et al. |

FOREIGN PATENT DOCUMENTS

| | | |
|---|---|---|
| JP | 2009161384 | 7/2009 |
| JP | 2012066997 | 4/2012 |
| KR | 101706272 | 2/2017 |
| WO | WO13156843 | 10/2013 |
| WO | WO14013379 | 1/2014 |
| WO | WO14013429 | 1/2014 |
| WO | WO14013515 | 1/2014 |
| WO | WO15090533 | 6/2015 |
| WO | WO15093760 | 6/2015 |
| WO | WO16107936 | 7/2016 |

* cited by examiner

DRY MIX AND CONCRETE COMPOSITION CONTAINING BED ASH AND RELATED METHODS

CROSS REFERENCE TO RELATED PATENT APPLICATIONS

This application is a continuation of U.S. application Ser. No. 17/950,637, now U.S. Pat. No. 11,840,482, filed Sep. 22, 2022, which is continuation of U.S. application Ser. No. 17/201,779, now U.S. Pat. No. 11,479,506, filed Mar. 15, 2021, which is a divisional of U.S. application Ser. No. 16/137,163, now U.S. Pat. No. 10,981,831, filed Sep. 20, 2018, which claims the benefit of priority to U.S. Provisional Application No. 62/561,556, filed Sep. 21, 2017, and to U.S. Provisional Application No. 62/641,838, filed Mar. 12, 2018, which are incorporated herein by reference in their entireties.

BACKGROUND

The disclosure relates generally to a concrete composition and more particularly to a concrete composition containing bed ash.

SUMMARY

According to one aspect, embodiments of a dry mix are provided. The dry mix includes aggregate, cement, and bed ash. The bed ash includes the combustion product of a fluidized bed coal combustion reaction.

In another aspect, embodiments of a method of preparing a dry mix are provided. The method includes a step of providing bed ash and cement. The bed ash contains the combustion product of a fluidized bed coal combustion reaction. The method also includes the steps of mixing the cement and the bed ash and adding aggregate to the mixed cement and bed ash.

In still another aspect, embodiments of a method of preparing a concrete composition are provided. The method includes a step of providing a dry mix. The dry mix includes aggregate, cement, and bed ash, the bed ash containing the combustion product of a fluidized bed coal combustion reaction. The method also includes the steps of mixing the dry mix with a fluid containing water to form a wet concrete and curing the wet concrete.

In exemplary embodiments, the combustion product of the bed ash is obtained from a fluidized bed coal combustion reaction of high sulfur coal. In such an embodiment, the combustion product may be treated with quicklime.

In other exemplary embodiments, the aggregate is a 2" rock, such as limestone.

In still other exemplary embodiments, the dry mix includes 35% to 75% by weight of aggregate, 30% to 50% by weight of bed ash, and 5% to 15% by weight of cement. Additionally, embodiments of the dry mix also contain a fluorite catalyst.

In another aspect, embodiments of the present disclosure relate to a method of repairing a soil slip on a slope. In the method, earth is excavated from the soil slip to a depth below a slip plane of the soil slip. The earth is mixed with a dry mix to create an augmented soil. The dry mix includes bed ash and cement. The augmented soil is replaced in the soil slip, and the augmented soil is compacted.

In embodiments of the method, the weight ratio of bed ash to cement in the dry mix is from 3:1 to 5:1, more particularly about 4:1. In embodiments, the dry mix comprises 18% to 20% by weight of the cement. Further, in embodiments, the dry mix further comprises aggregate. In a particular embodiment, the dry mix comprises substantially equal volumes of aggregate and of bed ash and cement. In embodiments, the aggregate is 2"×3" crushed stone.

In embodiments of the method, the step of excavating further comprises forming one or more keyways in the slope. Further, in embodiments, the augmented soil comprises 5% to 40% by weight of the dry mix, more particularly from 10% to 15% by weight of the dry mix.

In embodiments of the method, the step of replacing the augmented soil in the soil slip further comprises filling the soil slip in lifts of no more than 24". Further, in embodiments, the compacting step is performed after each lift.

In embodiments of the method, at least one horizontal catchment is formed on the slope. In embodiments, the horizontal catchment is located at a base of the slope between the slop and a roadway. In embodiments, the method does not comprise a step of adding water to the augmented soil.

While the invention will be described in connection with certain embodiments, there is no intent to limit it to those embodiments. On the contrary, the intent is to cover all alternatives, modifications and equivalents as included within the spirit and scope of the invention as defined by the appended claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
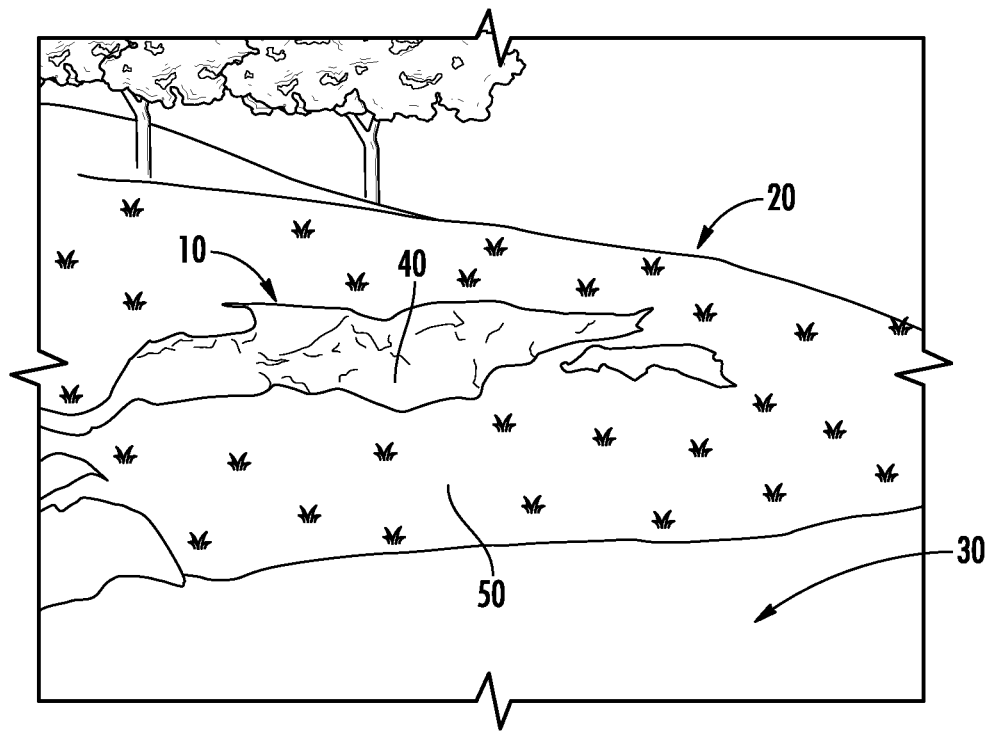
FIG. 1 depicts a soil slip on a slope.

Generally, in this disclosure, various embodiments of dry mix for a concrete composition are provided. The dry mix includes an aggregate material, cement, and bed ash. In particular, the bed ash is produced via a coal combustion in a fluidized bed reactor. More particularly, the bed ash is produced from a combustion reaction of high sulfur coal in which the combustion product has been post treated with quicklime. Advantageously, this type of bed ash absorbs a large amount of water in an exothermic hydration reaction, which decreases cure time and leads to high early strength.

Further, the dry mix is especially suited for repairing roads in underground mining applications where mixing the dry mix with water is difficult. Additionally, the bed ash is compliant with the Environmental Protection Agency's (EPA) Class 1 water quality standards, which is the most stringent water quality criteria under the Clean Water Act (33 U.S.C. § 1251 et seq.).

Additionally, the dry mix is especially suitable for repairing soil slips. In particular, the dry mix is mixed with earth excavated from the soil slip, the augmented soil is replaced over the damaged slope, and then refilled soil slip is compacted. Moisture from the ground reacts with the dry mix in the replaced material to prevent future slippage. While certain embodiments will be discussed herein by way of example, those skilled in the art will recognize from the following description that such embodiments are provided by way of example only, not by way of limitation, and that all alternative embodiments and applications are reserved herein.

As mentioned above, the dry mix is primarily composed of three components: an aggregate material, cement, and bed ash. Beginning with the bed ash, the bed ash contains the combustion product of a fluidized bed coal combustion reaction. Such fluidized bed coal combustion reactions include atmospheric pressure fluidized bed combustion, circulating fluidized bed combustion, and pressurized fluidized bed combustion. The bed ash produced from such reactions is also known as fluidized bed combustion ash (or "FBC ash") or bottom ash produced from a fluidized bed combustion. However, "bed ash" as used herein is not synonymous with other forms of bottom ash produced in other types of coal combustion reactions.

In a particular embodiment, the bed ash includes the fluidized bed combustion product of a combustion reaction of high sulfur coal. In embodiments, high sulfur coal refers to coal having a sulfur content of at least 1% by weight. In other embodiments, high sulfur coal refers to coal having a sulfur content of at least 3% by weight. In a particular embodiment, the combustion product is treated with quicklime. Advantageously, such bed ash passes the EPA's class I water quality standards for potable water supplies, as tested according to ASTM D3987-85.

Bed ash of this variety absorbs a large amount of water and, in doing so, undergoes an exothermic hydration reaction. As will be discussed more fully below, the heat released from the exothermic reaction decreases the cure time and enhances the high early strength of the concrete composition produced. In a particular embodiment, the bed ash absorbs at least its weight in water. In addition to absorbing a relatively high amount of water, the bed ash also absorbs the water quickly, which wicks the water into the matrix of the concrete composition. This wicking effect also enhances the high early strength of the concrete and decreases the cure time of the concrete composition produced. In an embodiment, the bed ash will absorb its weight of water in ten minutes or less. In another embodiment, the bed ash will absorb its weight in water in five minutes or less. During the absorption of the water, the bed ash swells, and the swelling provides two advantages. First, the swelling of the bed ash pre-stresses the matrix of the concrete composition, producing an overall stronger concrete composition. In embodiments, the bed ash swells at least 10% during hydration. In further embodiments, the bed ash swells at least 15% during hydration. Second, the swelling produces air spaces in the concrete, which enhances the flexibility of the concrete composition when put under high point loads, such as from heavy equipment hauling.

Having discussed the bed ash, attention is now turned to the cement. Portland cements are classified in categories defined by standard ASTM C150. Suitable portland cements for use in the dry mix include type I, type II, and type III cements, as well as combinations thereof. Type I cement is considered as a general purpose cement for use in most buildings, bridges, pavements, etc. and generally has a high tricalcium silicate ($C_3S$ in cement chemist notation) content for good early strength development. Type II cement is considered as having moderate sulfate resistance and is generally used in structures exposed to soil or water containing sulfate ions. Type III cement provides high early strength and may contain more $C_3S$ and be more finely ground than, e.g., type I and type II cements. While not classified under ASTM C150, the cement can also include calcium sulfoaluminate (CSA) cement in embodiments. Thus, suitable cements for use in the dry mix include type I cement, type II cement, type III cement, CSA cement, and combinations of two or more thereof.

In an embodiment, the bed ash is mixed with the cement in such a way that the cement coats the bed ash. In order to coat the bed ash, the cement is added in an amount sufficient to produce a ratio of bed ash to cement of from 3:1 to 5:1. In a specific embodiment, the ratio of bed ash to cement is 4:1. In another specific embodiment, the cement makes up from 18% to 20% by weight of the mixture of bed ash and cement. Advantageously, in the concrete composition made from the dry mix, the coating of the bed ash by the cement produces a bond between adjacent grains and the coarse aggregate further enhancing the flexibility of the concrete composition, especially when the concrete composition experiences heavy loads, such as in roadway applications.

Another component of the dry mix is the aggregate material. In an embodiment, the aggregate is rock having a typical cross-sectional dimension of from 1.5" to 3", i.e., the aggregate is 1.5" rock to 3" rock. In a particular embodiment, the aggregate is 2"×3" rock, i.e., rock that passes through a 2" mesh but is held by a 3" mesh. In a more particular embodiment, the aggregate is limestone or another similar rock. In the concrete composition, the aggregate material provides early strength and driveability. That is, in embodiments, the concrete composition can be driven over immediately after the concrete composition is laid. Advantageously, immediate application of pressure to the concrete composition compacts the aggregate material so as to form a tight interlocking of the aggregate material, enhancing the strength. Further, in the concrete composition, the aggregate material provides long term strength throughout the matrix by spreading out loads and by providing good bonding surfaces for the bed ash and cement bonds. Moreover, the aggregate material provides excellent wear surface that is able to withstand heavy equipment that travels over the concrete composition.

The three components of the dry mix are provided in the following amounts. The aggregate material is provided in an amount of from 35% to 75% by weight. The bed ash is provided in an amount of from 30% to 50% by weight, and the cement is provided in an amount of from 5% to 15% by weight. In a specific embodiment, the dry mix has the following composition: 50% by weight of the aggregate material, 40% by weight of the bed ash, and 10% by weight of the cement. In a further embodiment, the dry mix also includes a catalyst of fluorite ($CaF_2$). The fluorite can be present in an amount of up to 1% by weight. When included, the fluorite acts as a flux in the hydration and curing process, i.e., the fluorite acts as a cure accelerant to promote more rapid curing and/or hydration.

The embodiments of the dry mix described above can be used to form a concrete composition with the addition of water. In particular embodiments, four parts of dry mix are combined with one to two parts of water. Advantageously, the water does not need to be "clean," i.e., free of substantial particulate, dust, and other suspended solids. For example, in certain roadway applications, especially in the context of underground coal mining, muddy ruts, or mud-holes, will develop in the roadway. After the mud is dug out of the rut, "black water" still typically remains in the hole. The black water generally contains coal, clay, and limestone dust. Instead of having to remove this water before laying the concrete composition, the dry mix, in embodiments, is added directly to the black water with the black water serving as the water component, or as part of the water component, of the concrete composition. Despite using the black water in the concrete composition, the cure time and strength of the concrete composition are not diminished. Indeed, the suspended solids can, in some circumstances, even enhance the strength of the concrete composition.

As discussed herein, the concrete composition produced from the mixture of bed ash, cement, and aggregate material is particularly suitable for underground mining applications, especially underground coal mining application. Indeed, the high early strength decreases down time when, for example, roads in the underground mine degrade to the point of repair, which can be a frequent occurrence resulting from the movement of heavy equipment over such roads. Not only does the high early strength help prevent such degradation, but also when repairing the road, the uncured concrete composition beneficially experiences strengthen when driven over immediately after laying of the concrete composition. Further, as mentioned above, the concrete composition contains bed ash that meets the EPA's class I quality standards, which is especially important for underground mining applications. Notwithstanding the benefits of using the concrete composition in the mining industry, the concrete composition can also be used in other applications where high early strength is desired.

Besides repair of roadways, the dry mix is also especially suitable for repairing soil slips. A soil slip is essentially a slab of earth that slides down a slope. Often these are caused by a weakness in the soil on the slope that causes cracking of the soil at the end of the slab at higher elevation. These cracks may then fill with water, such as from a heavy rain, and the accumulation of weight at the top of the soil slab causes the slab to break away along a slip plane and slide down the slope. In some instances, a soil slip can be instigated under the influence of gravity alone on a crack. Initial cracks in the slope can be caused by the movement of heavy machinery over a slope, removal of trees or other vegetation from the slope, blasting, or the construction of structures, such as pipelines, in or along the slope. Regardless of the cause, it is often desirable to repair the soil slip to prevent erosion and future soil slips and/or for aesthetic reasons.

Figure 2:
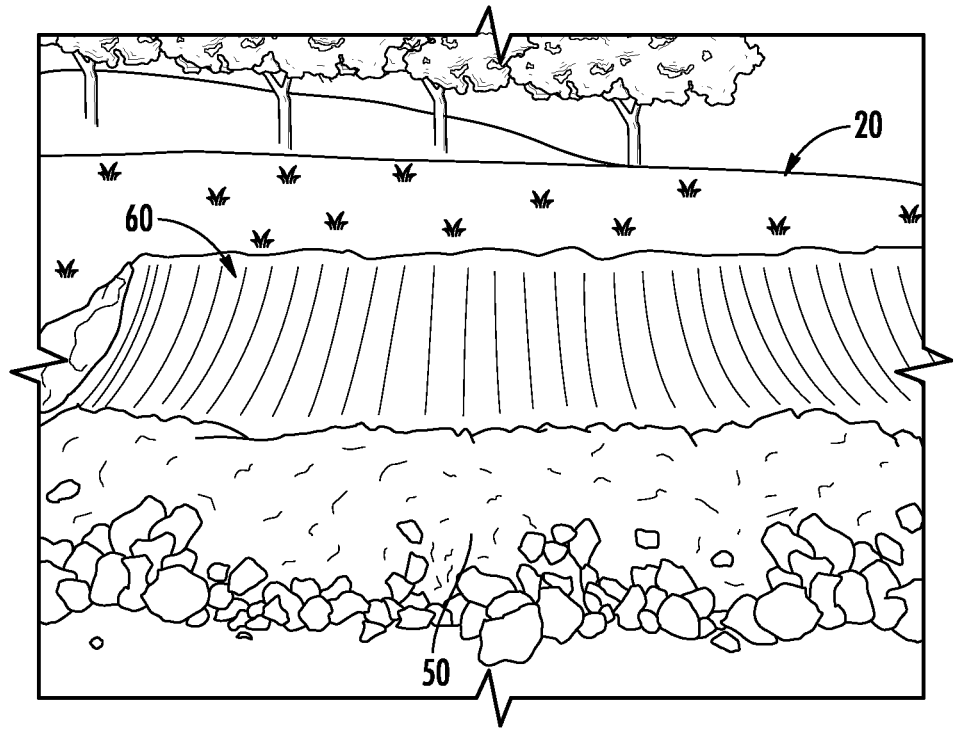
FIG. 2 depicts an excavated soil slip after a step of the repair method, according to an exemplary embodiment.

FIG. 1 depicts a soil slip 10 on a slope 20 near a roadway 30. As can be seen, the soil slip 10 runs horizontally across the slope 20, defining a slip plane 40 from which earth 50 separates and slides down the slope 20. In a first step of the slip repair method, the slope 20 is excavated to a depth deeper than the slip plane 40. In embodiments, especially for large soil slips 10, the excavation leaves keyways or benches in the slope 20 such that the slope 20 has a stepped structure. FIG. 2 depicts an excavated slope 60 in which the soil slip 10 has essentially been removed. As can be seen in FIG. 2, the excavated slope 60 does not feature horizontal keyways. As will be understood by a person of ordinary skill in the art, the need for such keyways as well as the number and specific configuration will vary on a job-by-job basis and is generally left to the discretion of the site manager/engineer.

Figure 3:
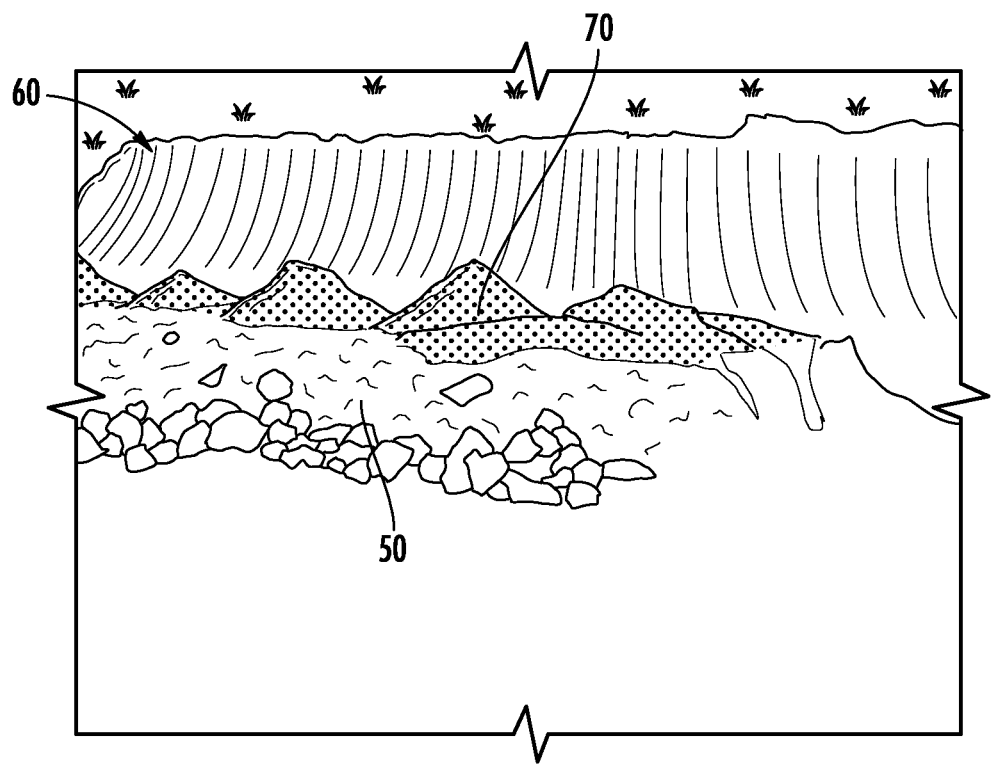
FIG. 3 depicts the mixing of the dry mix composition with the excavated earth to form an augmented soil in another step of the repair method, according to an exemplary embodiment.
Figure 4:
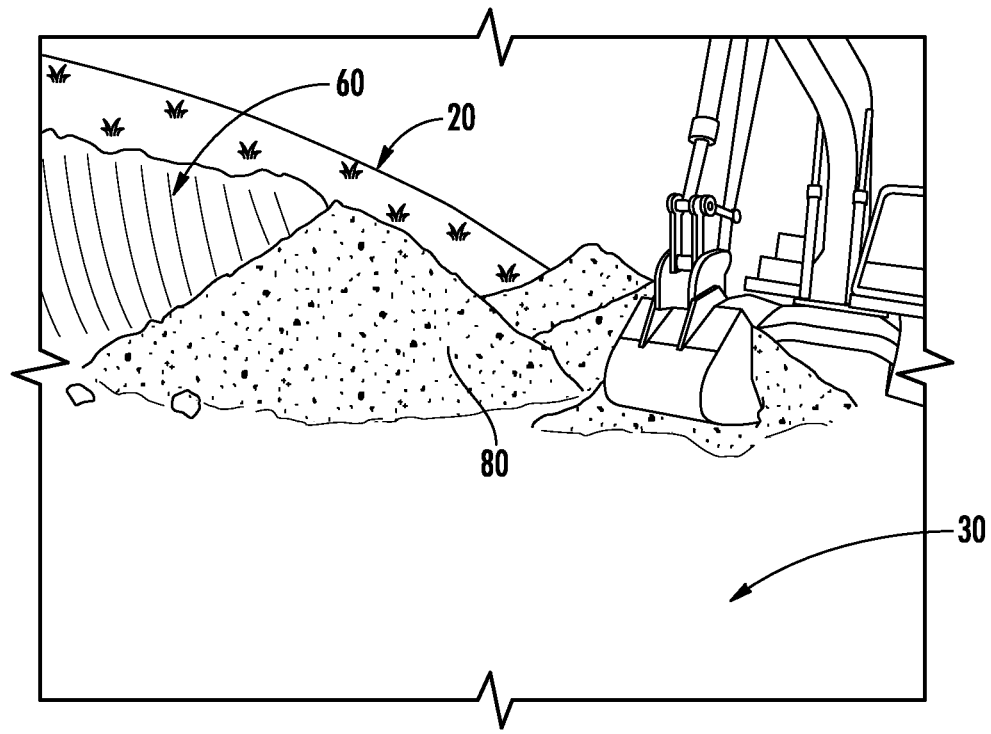
FIG. 4 depicts the augmented soil being replaced on the slope in a further step of the repair method, according to an exemplary embodiment.

After the excavation step, dry mix 70 is added to the earth 50 from the excavated slope 60 (FIG. 3) to form an augmented soil 80 (FIG. 4). In embodiments, the dry mix contains bed ash, cement, and (optionally) aggregate and can be any of the dry mix embodiments discussed herein. In general, the bed ash and the cement are provided together with the aggregate, and in other embodiments, the bed ash and cement are provided separately from the aggregate, which may instead be locally sourced. In the latter embodiment, advantageously, the shipping weight and/or cost of the dry mix 70 may be lower. Further, in some embodiments, e.g., where the earth contains particularly rocky soil, the dry mix 70 does not contain separate aggregate. Additionally, in some embodiments, the augmented soil 80 need not contain any aggregate.

As discussed above, the bed ash and cement are provided in a ratio of bed ash to cement of from 3:1 to 5:1, more particularly at 4:1, and still more particularly, the cement is 18% to 20% by weight of the total amount of bed ash and cement. Further, for soil slip repair in which aggregate is used, the aggregate may be in the form of 2"×3" crushed stone (i.e., the crushed stones pass through a 3" screen but are held by a 2" screen). In embodiments, the aggregate may be added in equal volume to the bed ash and cement. In embodiments, the dry mix 70 (with or without aggregate) is added to earth 50 in an amount of 5% to 40% by weight of the augmented soil 80. In certain embodiments, the dry mix 70 (with or without aggregate) is added to the earth in an amount of 10% to 15% by weight of the augmented soil 80.

In order to activate the dry mix 70, water is pulled from the excavated earth 50 and/or from the ground by the wicking action of the bed ash. Thus, in embodiments, only as much augmented soil 80 as can be replaced on the same day as mixing is created because otherwise the bed ash and cement will prematurely react with the water in the excavated earth 50 and harden before it is able to be replaced in the excavated slope 60. However, in embodiments where the excavated earth 50 is particularly dry, more augmented soil 80 can be created than can be replaced on the same day as mixing because the concern of premature hardening of the augmented soil 80 is lessened.

Figure 5:
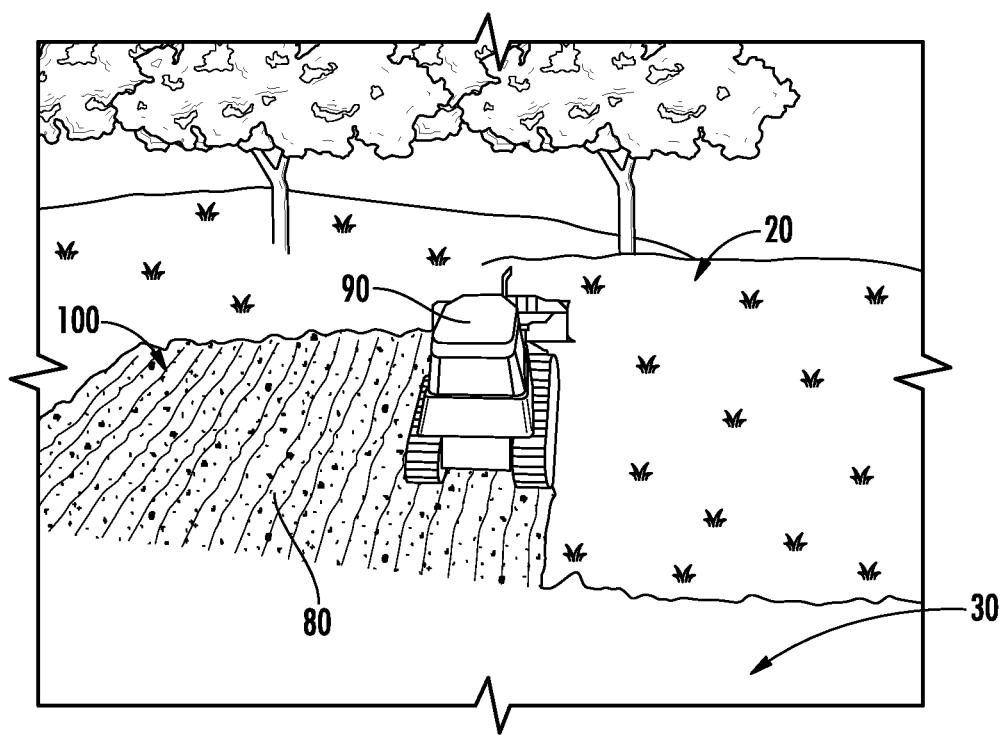
FIG. 5 depicts the augmented soil being compacted in a final step of the repair method, according to an exemplary embodiment.

After mixing, the augmented soil 80 is replaced on the excavated slope 60 as shown in FIG. 4. In embodiments, the augmented soil 80 is replaced in horizontal lifts that are under 24" in thickness. Further, each lift is compacted with a compactor, such as a dozer 90 or a sheep's foot compactor. Thus, for example, in a deep soil slip 10, the depth of the soil slip 10 is filled no more than 24" at a time, and after each 24" lift, the augmented soil 80 is compacted. FIG. 5 depicts the filled soil slip 100 that is being compacted with a dozer 90. In embodiments, one or more horizontal catchments are provided for silt and runoff. For example, a horizontal catchment can be in the form of a ditch placed between the filled soil slip 100 or slope 20 and the roadway 30. As with the keyways above, the number and placement of any horizontal catchments will vary on a job-by-job basis and is generally left to the discretion of the site manager/engineer as is understood by a person of ordinary skill in the art.

The dry mix 70 will pull water from the earth 50 or from deeper in the ground of the slope 20. As discussed above, the bed ash draws water to the cement and helps initiate hydration reaction with the cement. Thus, the augmented soil 80 does not need to be watered for the purpose of triggering the hardening reaction. However, water can be minimally applied to prevent dust from being stirred up in the wind.

As described above, the dry mix 70 (with or without aggregate) is especially suitable for repairing soil slips because the bed ash contained in the dry mix 70 is able to dry out the slip very quickly on account of the bed ash's ability to rapidly absorb large amounts of water as described above. Indeed, the dry mix 70 allows for the efficient and stable repair of soil slips 10 in which the dry mix 70 is able to be mixed with the excavated earth 50 and be replaced in the soil slip 10.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of preparing a concrete structure, comprising:
   premixing cement and bed ash such that the cement coats the bed ash;
   mixing water and a dry mix to form a wet concrete, the dry mix comprising from 35% to 75% by weight aggregate, from 30% to 50% by weight of the bed ash, and from 5% to 15% by weight of the cement; and
   allowing the wet concrete to cure to form the concrete structure.

2. The method of claim 1, wherein mixing water and the dry mix further comprises mixing four parts dry mix with one to two parts water.

3. The method of claim 1, wherein a ratio of bed ash to cement is from 3:1 to 5:1.

4. The method of claim 1, wherein a ratio of bed ash to cement is 4:1.

5. The method of claim 1, wherein the dry mix comprises about 50% by weight aggregate, about 40% by weight bed ash, and about 10% by weight cement.

6. The method of claim 1, wherein the aggregate is 2"×3" rock.

7. The method of claim 1, wherein the aggregate is limestone.

8. The method of claim 1, wherein the bed ash comprises a combustion product of a fluidized bed coal combustion reaction.

9. The method of claim 8, wherein the fluidized bed coal combustion reaction involves high-sulfur coal.

10. The method of claim 9, wherein the combustion product has been post-treated with quicklime.

11. The method of claim 1, wherein the cement includes at least one of type I cement, type II cement, type III cement, or calcium sulfoaluminate cement.

12. The method of claim 1, further comprising applying the wet concrete to an underground road or to a hole in an underground road.

13. The method of claim 1, wherein the water is absorbed from surrounding soil in a soil slip.

14. A method of preparing a concrete structure, comprising:
    mixing water and a dry mix to form a wet concrete, the dry mix comprising from 35% to 75% by weight aggregate, from 30% to 50% by weight bed ash, and from 5% to 15% by weight cement; and
    allowing the wet concrete to cure to form the concrete structure;
    wherein the dry mix further comprises a fluorite catalyst.

15. The method of claim 14, wherein the dry mix comprises up to 1 wt % of the fluorite catalyst.

16. The method of claim 14, wherein the fluorite catalyst is $CaF_2$.

17. A method of preparing a concrete structure, comprising:
    mixing water and a dry mix to form a wet concrete, the dry mix comprising from 35% to 75% by weight aggregate, from 30% to 50% by weight bed ash, and from 5% to 15% by weight cement; and
    allowing the wet concrete to cure to form the concrete structure;
    wherein mixing is performed in a mud hole.

18. The method of claim 17, wherein the water is black water.

19. The method of claim 18, further comprising digging mud out of the mud hole before mixing.

* * * * *